United States Patent [19]

Lamel et al.

[11] 3,906,434

[45] Sept. 16, 1975

[54] THREE-TERMINAL TELEMETERING SYSTEM FOR OIL WELLS

[75] Inventors: Arthur E. Lamel, Arcadia; William D. Squire; Harper J. Whitehouse, both of San Diego, all of Calif.

[73] Assignee: American Petroscience Corporation, Bakersfield, Calif.

[22] Filed: Sept. 12, 1973

[21] Appl. No.: 396,403

Related U.S. Application Data

[62] Division of Ser. No. 113,147, Feb. 8, 1971, Pat. No. 3,790,930.

[52] U.S. Cl........... 340/18 NC; 340/18 LD; 175/39; 175/40
[51] Int. Cl............................................... G01v 1/40
[58] Field of Search......... 340/18 NC, 18 LD, 18 P, 340/18 C, 18 M; 73/DIG. 6; 166/113; 175/39, 50; 324/5

[56] References Cited
UNITED STATES PATENTS

| 3,205,477 | 9/1965 | Kalbfell ........................ 340/18 NC |
| 3,588,804 | 6/1971 | Fort ............................... 340/18 LD |
| 3,711,825 | 1/1973 | Claycomb..................... 340/18 LD |

OTHER PUBLICATIONS

Barnes et al., "Passbands for Acoustic Transmissions on Idealized Drill String," J.A.S.A., Vol. 51, Part 2, pp. 1606–1608, 1972.

*Primary Examiner*—Maynard R. Wilbur
*Assistant Examiner*—N. Moskowitz
*Attorney, Agent, or Firm*—Forrest J. Lilly

[57] ABSTRACT

An acoustic communication method and system for transmitting information through a well bore drill string or other pipe by establishing in the pipe modulated acoustic waves, preferably torsinal waves of zero order, which contain the information to be transmitted and travel from a down-hole signal transmitting station to a signal receiving station spaced along the pipe and located top-side, and for demodulating the modulated waves arriving at the receiving station to recover the transmitted information. The modulated waves are established in the pipe by driving the pipe in acoustic oscillation and modulating the resulting acoustic waves in the pipe at the down-hole transmitting station. In its principal application, the invention is utilized to monitor selected well drilling parameters, such as temperature, formation pressure, formation porosity, drill string orientation, and/or to operate devices within the well bore. Primary advantages of the invention are reduced acoustic transmission losses from acoustic coupling to the drilling fluid and well bore wall and the ability to transmit information while drilling is in progress. According to the preferred practice of the invention, when monitoring drilling parameters, torsional acoustic waves are launched downwardly through the drill string from the surface by exciting the upper end of the string in a zero order torsional acoustic oscillation at frequencies within the base band of the drill string acoustic transmission characteristics so as to minimize attenuation of the acoustic waves by the couplings between the drill string pipe sections. These torsional acoustic waves are modulated at a subsurface signal-transmitting station along the drill string and returned back through the string to a surface signal-receiving station where the modulated waves are demodulated to recover the transmitted information.

20 Claims, 15 Drawing Figures

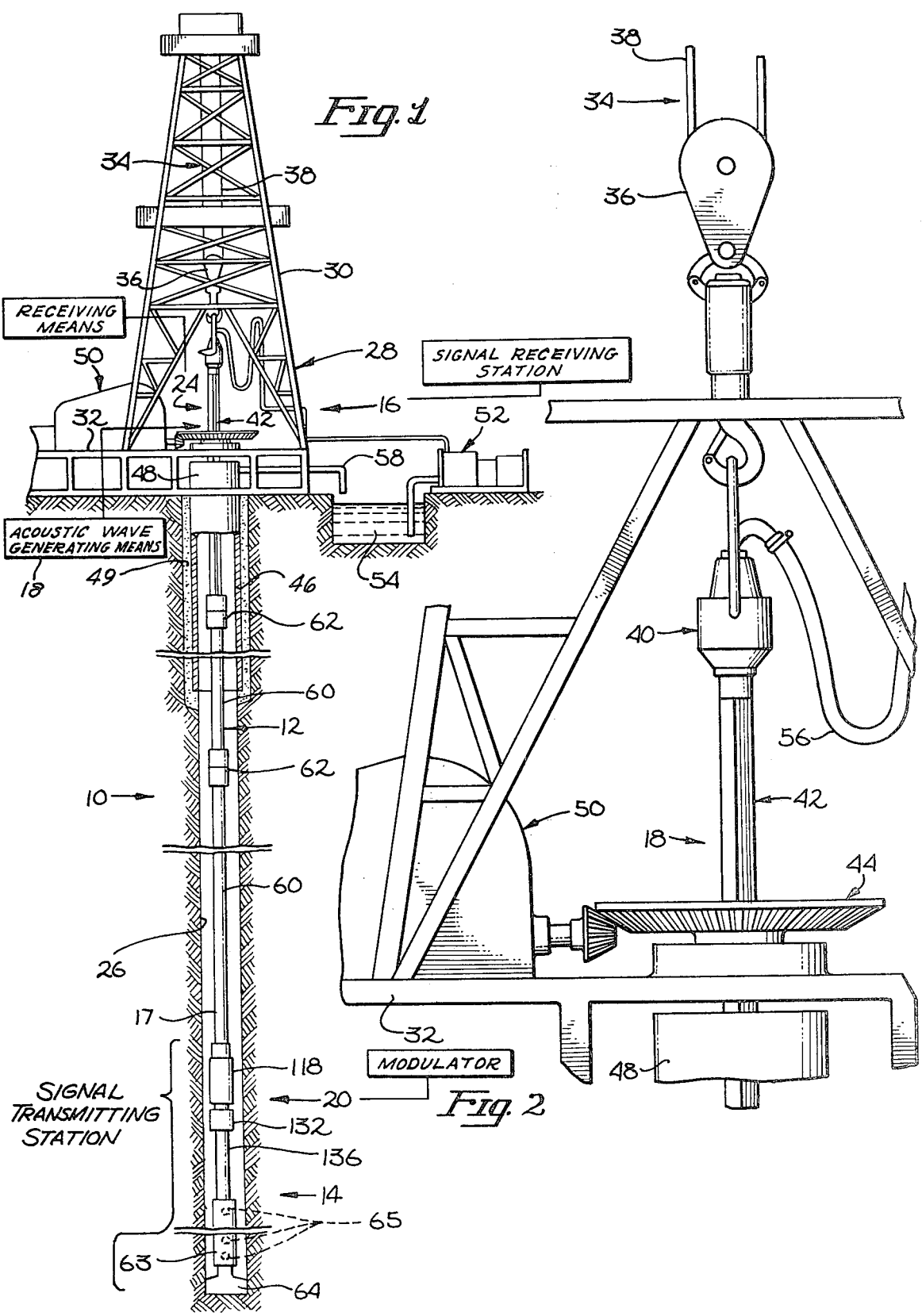

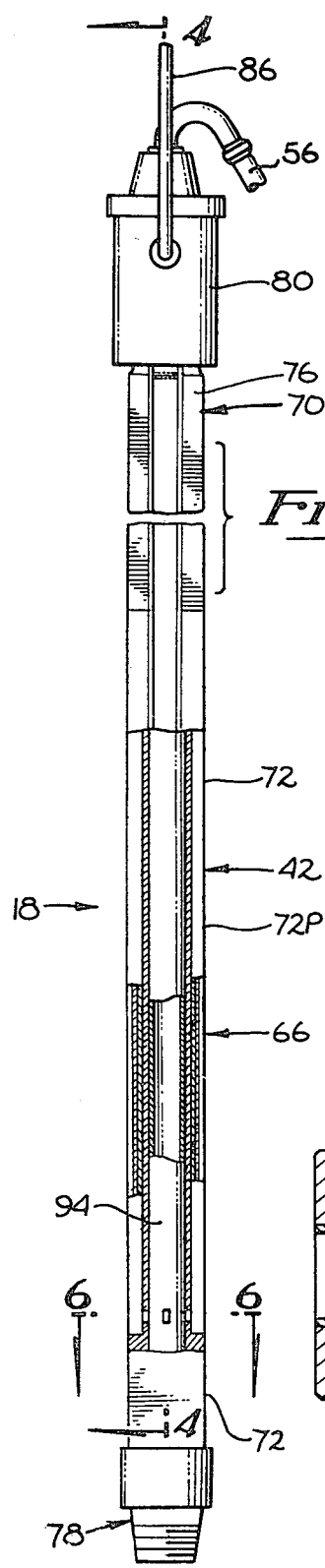
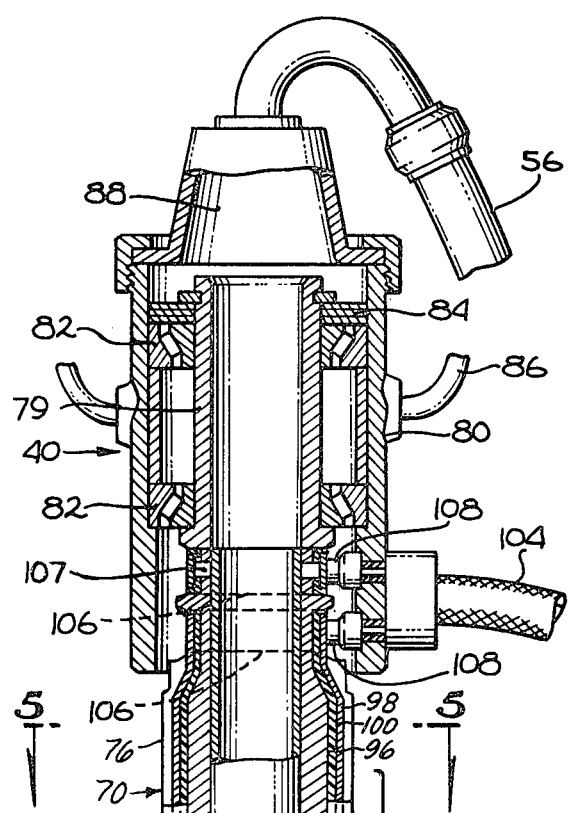
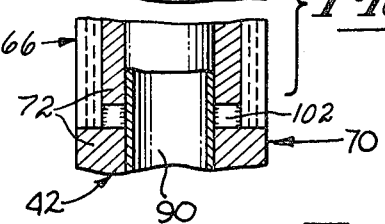
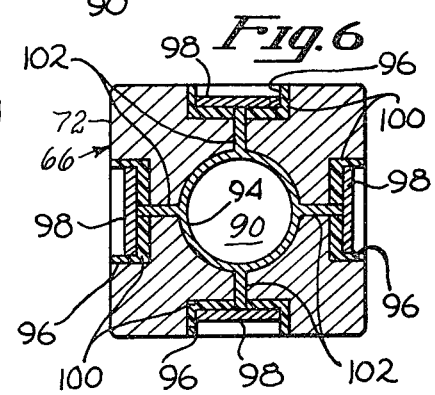

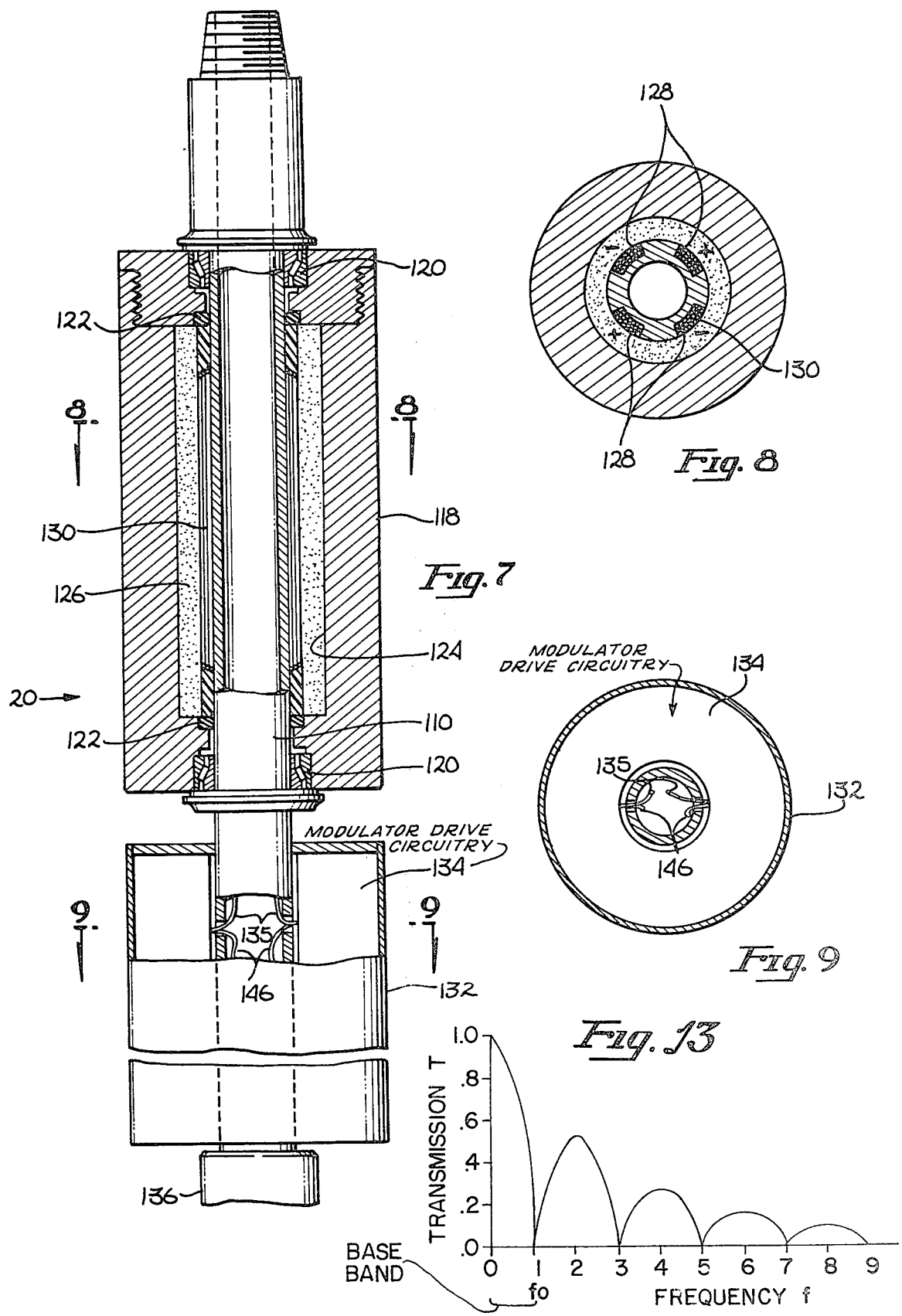

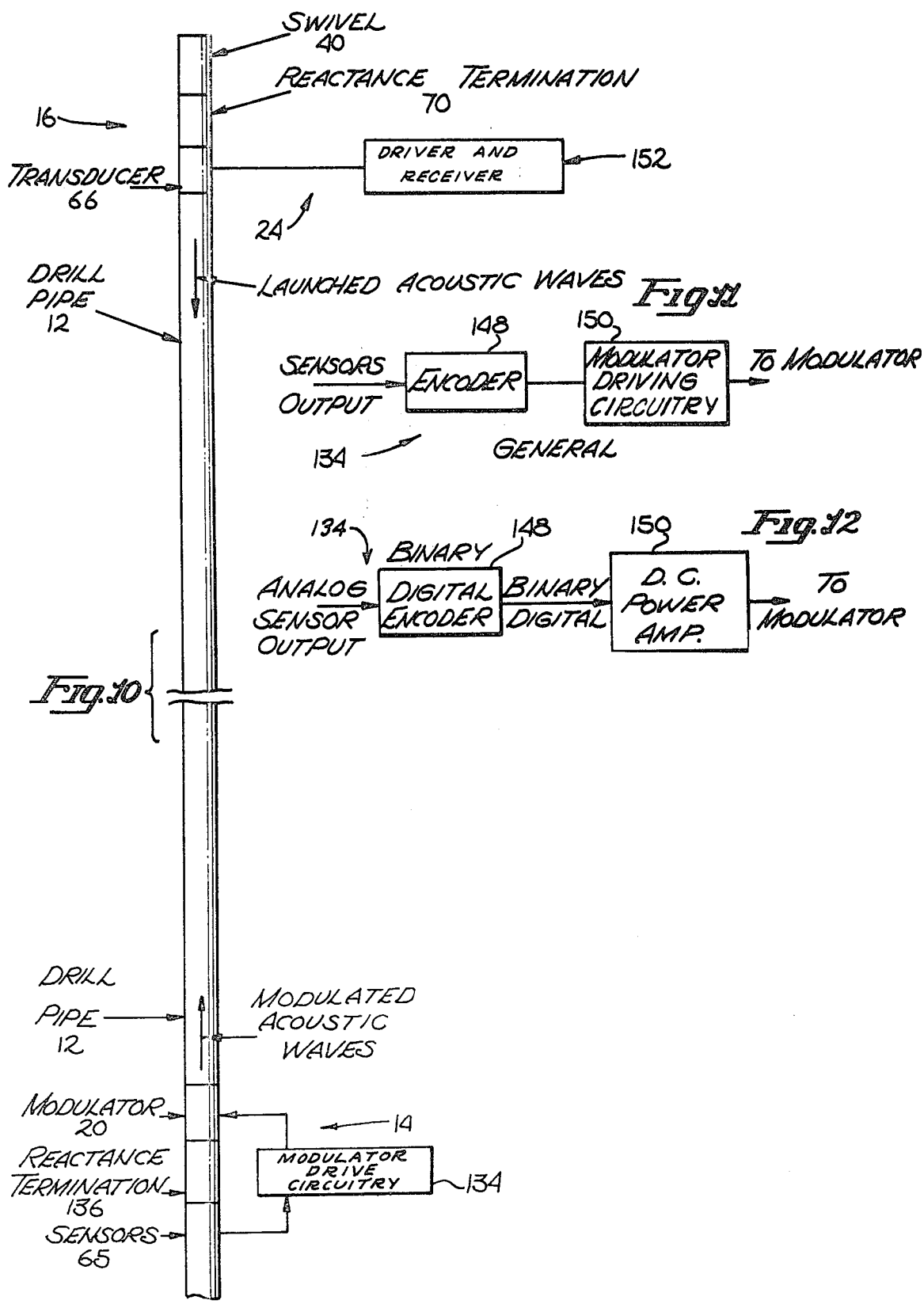

BLOCK DIAGRAM OF
TOPSIDE ELECTRONIC CIRCUITY
FOR DOWN-HOLE MODULATION AND RETURN
OF SIGNAL TRANSMITTED FROM TOPSIDE

THREE-TERMINAL TELEMETERING SYSTEM FOR OIL WELLS

RELATED APPLICATION

This application is a division of our parent application, Ser. No. 113,147, now U.S. Pat. No. 3,790,930 filed Feb. 8, 1971 and entitled "Telemetering System for Oil Wells."

BACKGROUND OF THE INVENTION

1. Field of the Invention

This invention relates generally to the art of transmitting telemetric and control information through a hollow well bore drill string or other pipe. More particularly, the invention relates to an improved acoustic communication method and system for the purpose described wherein the information carrier is provided by torsional acoustic waves preferably of zero order.

2. Description of the Prior Art

As will appear from the ensuing description, the present acoustic communication method and system may be employed to transmit information between two points of any pipe having an intervening length capable of sustaining torsional acoustic waves, particularly torsional waves of zero order. However, the principal application of the invention involves transmission of telemetric and control information through a hollow drill string suspended within a well bore. Accordingly, the invention will be disclosed in connection with this particular application.

When drilling a well bore, it is desirable, if not essential, to monitor selected drilling parameters in the vicinity of the drill bit for the purpose of providing the drilling operator with sufficient information to properly control the drilling operation. Among the drilling parameters which provide valuable information to the drilling operator are temperature, formation pressure, formation porosity, and others. See our parent U.S. Pat. No. 3,790,930. In slant drilling operations, such as off-shore drilling of multiple wells from a single platform or island, an additional drilling parameter which provides extremely valuable, if not essential information to the drilling operator, is drill string orientation.

Such drill string orientation is expressed in terms of the azimuth and pitch or inclination of the lower end of the string and must be accurately measured at frequent intervals during the drilling operation in order to maintain the proper slant drilling direction.

At the present time the most widely used method of measuring drill string orientation involves the use of a well log which is lowered on a cable through the hollow drill string to the bottom of the well bore. This log contains instruments, such as a compass and a spirit level or pendulum, for sensing drill string azimuth and inclination and a camera for photographically recording the instrument readings. After actuation of the camera to record these instrument readings, the log is withdrawn from the drill string and the film is developed to obtain the readings. While this method provides accurate information concerning drill string orientation, it is extremely time-consuming and substantially increases the total drilling cost. Thus, each well logging operation involves cessation of drilling, uncoupling the drilling kelly from the drill string, lowering and subsequently raising the log the whole length of the drill string, recoupling the kelly to the drill string, and resumption of the drilling operation. In many offshore drilling operations, periodic logging of the well bore in this fashion may account for up to one-half the total drilling time and hence for a large portion of the total drilling cost.

The present invention proposes to avoid the above and other disadvantages of the described well logging technique and to improve on the existing techniques for monitoring other drilling parameters by providing a novel and improved acoustic communication method and system for transmitting telemetric information through a drill string. As will appear from the later description, such information transmission may occur while the drill string is stationary or rotating.

The prior art relating to well drilling is replete with a vast assortment of acoustic communication techniques for transmitting information through a drill string. Simply stated, such communication techniques involve propagation through the drill string from one position or station to another of modulated acoustic waves containing the information to be transmitted, and demodulation of the modulated waves at another position or station along the drill string to recover the transmitted information. In the present disclosure, the station from which the modulated acoustic waves propagate is referred to as a signal-transmitting station. The position at which the modulated waves are demodulated to recover the transmitted information is referred to as a signal-receiving station.

The prior acoustic communication systems for transmitting information through a drill string are deficient in that they utilize relatively inefficient modes of acoustic wave propagation and thus achieve, at best, only marginal information transmission. In this regard, it is significant to note that most published patents in the field use such descriptors as vibrations, sound, acoustic waves, and the like, to describe the acoustic information carrier, and do not specifically define the exact mode of acoutic wave propagation. Those patents which do describe a specific form of acoustic wave propagation utilize either longitudinal or flexural vibration modes. These latter vibration modes, however, are ill suited for use in transmitting information through a drill string owing to the large transmission losses which occur as a result of acoustic coupling of the drill string to the drilling fluid and the wall of the well bore.

Because of these large transmission losses, the patented drill string communication systems are at best capable of operation only in a manner wherein the acoustic waves are modulated and launched upwardly through the drill string from a signal-transmitting station at the lower end of the string to a signal receiving station at the surface. This manner of operation requires installation of the acoustic wave transducer and its electronic driving circuitry within the lower end of the drill string. Accordingly, the transducer and circuitry must be designed to fit the envelope of the drill string and to survive the hostile environment existing within the lower end of the well bore during drilling. In addition, servicing and replacement of the transducer and its circuitry requires removal of the entire drill string from, and subsequent lowering of the entire drill string into, the well bore.

SUMMARY OF THE INVENTION

The present invention provides an improved acoustic communication method and system of the class described whose primary application involves transmission of telemetric and control information through a drill string suspended within a well bore from a surface drilling platform. According to the invention, acoustic waves are first established in the drill string and these waves are modulated at a signal transmitting station by exciting an acoustic wave modulator in the drill string with a modulating signal representing the information to be transmitted.

Telemetric signals transmitted through the drill string may represent selected drilling parameters in the vicinity of the drill bit, such as temperature, formation pressure, formation porosity, drill string orientation, and others. In this case, modulation occurs at a subsurface signal-transmitting station adjacent the lower end of the drill string with telemetric signals from sensors responsive to the selected drilling parameters to be monitored. In its broadest scope, the invention contemplates the use of any acoustic waves which may be launched through a drill string and modulated to transmit information through the string. However, the preferred waves are torsional acoustic waves of zero order, that is, torsional acoustic waves characterized by pure rotation of the drill string about its central axis. Such zero order torsional waves are non-dispersive, i.e., the velocity of the waves is independent of their frequency, while most other acoustic wave forms are dispersive. Non-dispersive wave propagation through a drill string is highly desirable, and often essential to rapid signal transmission through the string for the reason that dispersion smears the information signals modulated on the waves. Such torsional waves also couple less acoustic energy into the drilling fluid and wall of the well bore than do longitudinal or flexural waves and thus permit efficient signal transmission through a greater length of drill string.

Another important aspect of the invention involves the direction of torsional wave propagation through the drill string. According to this aspect of the generic invention, the torsional acoustic waves may be launched downwardly through the drill string from the surface or upwardly through the drill string from the lower end of the string. In the preferred practice of the invention involving transmission of telemetric signals representing selected drilling parameters, the torsional acoustic waves are launched downwardly through the drill string from top-side, e.g., the surface drilling platform to a subsurface signal-transmitting station at the lower end of the drill string. The waves arriving at the lower transmitting station are modulated with the telemetric signals to be monitored and returned back through the drill string to a signal receiving station at the drilling platform where the modulated waves are demodulated to recover the transmitted signals. This method of wave propagation is permitted because of the above-described reduction in acoustic transmission losses which results from the use of torsional acoustic waves, particularly torsional waves of zero order whose frequencies lie within the base band of the drill string acoustic transmission characteristics. Such a propataion method is preferred for the reason that the torsional wave generator, comprising a transducer and its electronic driving circuitry, may be located out of the well bore at the drilling platform. The torsional wave generator is thereby isolated from the hostile environment in the well bore and is readily accessible for repair and servicing without removal of the drill string. Also, the drill string envelope imposes no constraint on the size and arrangement of the generator.

A further important aspect of the generic invention is concerned with the actual generation of the torsional acoustic waves within the drill string. According to this aspect, the invention contemplates two different methods of acoustic wave generation. One method involves utilization of the torsional acoustic waves which are inherently produced in a rotating drill string during a drilling operation. In this regard, it is well-known that a drill string cutting bit, in the process of cutting into an earth formation, generates large quantities of noise which are transmitted along the drill string. Since the cutting motion is primarily a turning or twisting motion, a large component of this noise is torsional in character, i.e., consists of torsional acoustic waves. Such torsional waves are composed of relatively broadband components and narrow spectral lines or frequency bands generated by the teeth of a cutting bit and the gears in the mechanical drill string drive. The rotation generated torsional waves are modulated at the bottom of the drill string in a manner to effectively transmit upwardly through the string selected torsional wave components representing information signals. These signals may be detected at the surface to recover the transmitted information. This specific process and system is claimed in a continuing application to be filed later. See also our parent U.S. Pat. No. 3,790,930.

The preferred method of acoustic wave generation contemplated by the invention involves the use of a transducer, preferably a crossed-field magnetostrictive transducer, energized by an electrical driving signal of the proper frequencies to drive the drill string in torsional acoustic oscillation in a manner to produce in the string torsional acoustic waves preferably torsional waves of zero order.

In the preferred embodiment, the drill string is driven in its base band of torsional acoustic transmission. In this band, the acoustic attenuation or acoustic transmission losses produced by the drill string are minimized. This reduction of the acoustic transmission losses in the drill string, along with the earlier mentioned reduction in transmission losses resulting from the use of torsional waves, enable operation of the present communication system in its preferred operating manner, referred to earlier. It will be recalled that in this preferred operating manner, the torsional acoustic waves are launched downwardly through the drill string from the surface, modulated at the subsurface signal-transmitting station with the telemetric signals to be monitored, and then returned back to the surface signal-receiving station.

BRIEF DESCRIPTION OF THE DRAWINGS

FIG. 1 illustrates well bore drilling apparatus embodying a drill string communication system according to the invention;

FIG. 2 is an enlarged detail of the rotary table kelly and hoist of the drilling apparatus;

FIG. 3 is an enlarged longitudinal section through the drilling kelly illustrating a magnetostrictive transducer embodied in the kelly;

FIG. 4 is a further enlarged section taken on line 4—4 in FIG. 3;

FIG. 5 is an enlarged section taken on line 5—5 in FIG. 4;

FIG. 6 is an enlarged section taken on line 6—6 in FIG. 3;

FIG. 7 is an enlarged section through an inertial modulator embodied in the communication system;

FIG. 8 is a section taken on line 8—8 in FIG. 7;

FIG. 9 is a section taken on line 9—9 in FIG. 7;

FIG. 10 is a diagrammatic illustration of the drill string communication system;

FIGS. 11 and 12 are diagrams of alternative well bore modulator circuitry of the communication system;

FIG. 13 is a diagram of the acoustic transmission characteristics of a drill string;

DESCRIPTION OF THE PREFERRED EMBODIMENTS

Figure 14:
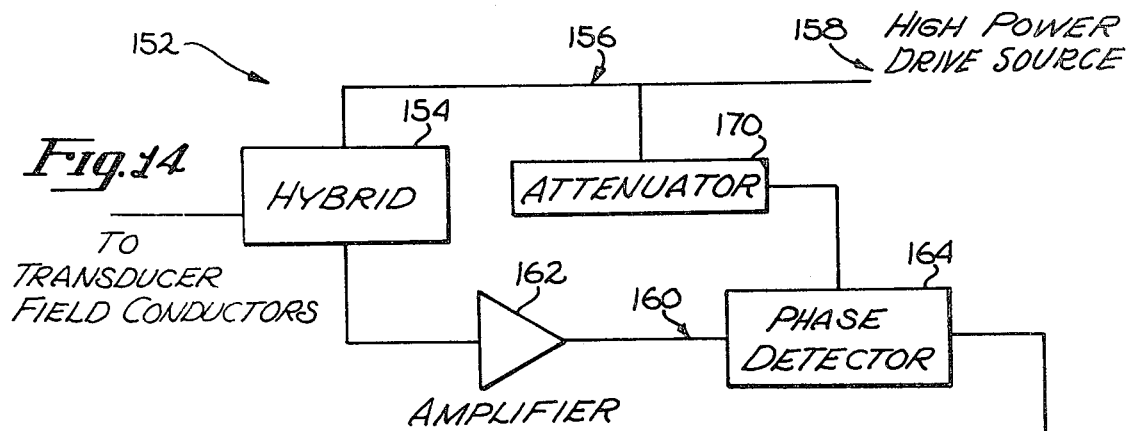
FIG. 14 is a diagram of the top side transducer electronics of the communication system.

Turning now to FIGS. 1–14, there is illustrated a communication system 10 according to the invention for transmitting information through a subsurface pipe 12 from a signal-transmitting station 14 to a signal-receiving station 16 through an intervening length 17 of the pipe which is capable of sustaining torsional acoustic oscillations. The communication system includes wave generating means 18 for inducing in the pipe 12 torsional acoustic waves, means 20 at the signal-transmitting station 14 for modulating the waves with a modulting signal representing the information to be transmitted, and receiving means 24 at the signal-receiving station 16 for demodulating the modulated waves to recover the transmitted information. The particular embodiment of the invention selected for illustration represents the primary application of the communication system. In this case, the pipe 12 is a drill string suspended within a well bore 26 from a surface drilling platform 28. The communication system is utilized to transmit signals along the drill string between the transmitting and receiving stations. These transmitted signals may be either control signals for operating, from the drilling platform, a device within the well bore, or telemetric signals representing selected drilling parameters to be monitored at the platform.

The drilling platform 28 is conventional and hence need not be described in elaborate detail. Suffice it to say that the platform has a derrick 30 mounted on a floor 32 and supporting a hoist 34. Hoist 34 includes a traveling block 36 supported by a cable 38 and carrying a swivel 40. This swivel provided a rotatable connection between the traveling block and the drilling kelly 42 at the upper end of the drill string 12. Kelly 42 extends downwardly through a rotary table 44 on the derrick floor 32 and through the well casing 46 and a blow-out preventer 48 sealed to the wall of the well bore as at 49. The upper end of the drill string 12 proper is connected to the lower end of the kelly. The hoist 34 and rotary table 44 are powered by a draw works 50. A drilling fluid circulation pump 52 delivers drilling fluid or mud under pressure from a mud pit 54 or other fluid reservoir to the swivel 40 through a mud hose 56. The mud flows downwardly through the kelly 42 and the drill string 12 and finally returns to the surface through the well bore, about the outside of the drill string, and then through blow-out preventer 48. The mud flows from the blow-out preventer back to the reservoir through a return line 58.

Drill string 12 is composed of individual drill pipe sections 60 of usually uniform length joined end to end by couplings 62 which are commonly referred to as tool joints. In some cases the drill string may contain additional sections, known as drill collars. Each drill string section 60 normally has a length of approximately 30 feet. Drill collar 63 and a drill bit or cutter 64 are coupled to the lower and of the drill string.

In operation of the illustrated drilling rig, the rotary table 44 is driven in rotation by the draw works 50 to drive the kelly 42 and hence the drill string 12, in its rotary drilling motion. The hoist 34 is operated to support a portion of the drill string weight, such as to maintain the proper drilling pressure on the cutter 64. The mud pump 52 is operated to provide continuous circulation of drilling mud through the well bore to lubricate the cutter and remove debris from the well bore.

The particular acoustic communication system 10 of the invention which has been selected for illustration in FIGS. 1–14 is designed for monitoring selected drilling parameters in the vicinity of the drill bit in order to provide the drilling operator with sufficient information to effectively control the drilling operation. As noted earlier, typical drilling parameters which provide valuable information to the drilling operator are temperature, formation pressure, formation porosity, drill string orientation, and other. In this case, the signal transmitting station 14 is located at the lower end of the drill string 12, and the signal-receiving station 16 is located at the drilling platform 28. Sensors 65 are shown mounted within the drill collar 63 to sense the drilling parameters to e monitored. These sensors are connected to the modulating means 20 and provide signals representing the monitored drilling parameters. The modulating means process the sensor output signals to provide a modulating or telemetric signal containing information representing all of the monitored drilling parameters and modulates the acoustic waves induced in the drill string 12 by the wave generating means 18 with the telemetric signal. The modulated waves travel up the string to the surface signal-receiving station 16 where the waves are demodulated by the receiving means 24 to recover the transmitted drilling parameter information.

In certain of its aspects the invention contemplates the use of any acoustic waves capable of modulation by the telemetric signal to be transmitted and capable of propagation through the drill string 12 with sufficiently small acoustic loss and dispersion over the length of the drill string to provide efficient signal reception at the signal receiving station 16. In this regard, it is significant to recall that torsional acoustic waves, however, are superior to all other acoustic wave forms, such as longitudinal and flexural for acoustic signal transmission through a drill string, since torsional waves couple less acoustic energy into the drilling fluid and the wall of the well bore. According to the preferred practice of the invention, especially for depths of which communication becomes difficult, or otherwise impossible, the torsional waves used for signal transmission are torsional acoustic waves of zero order. Such waves are characterized by pure rotation of each transverse section of the drill string within an advancing wave front about the longitudinal axis of the string. The major advantage of such zero torsional waves resides in the fact that they are non-dispersive. Most other acoustic modes of propagation are dispersive. Non-dispersive torsional wave propagation is desirable, and essentially to rapid efficient signal transmission through a drill string, since dispersion smears the transmitted signal along the string and renders difficult recovery of the signal at the signal receiving station.

The frequency of the torsional waves is also an inportant factor in efficient signal transmission through the drill string 12 in that the couplings 62 which join the drill string pipe sections 60 acoustically load the string and the mud about the string attenuates higher frequencies of acoustic oscillation. The jointed string thus tends to pass lower accoustic frequencies with less attenuation than higher frequencies, due to the frequency dependent attenuation of the mud, while the couplings 62 introduce zeros of transmission as shown in FIG. 13. According to the preferred practice of the invention, the frequency of the torsional acoustic waves employed for signal transmission is selected to effect wave propagation through the drill string in its base band of transmission. This is the band from zero frequency to the first zero of transmission, $f_o$. In this band, the mud produces minimum attenuation of the waves and thus permits maximum signal transmission through the string. However, in its broader scope, the invention contemplates acoustic wave propagation through the drill string in its higher pass bands so long as suitable signal reception is possible at the signal receiving station. The drill string communication system in FIGS. 1–14, employs a presently preferred crossed-field magnetostrictive transducer which is embodied in the forms a load bearing part of the kelly 42. It should be noted that by employing a bias field coincident with rather than crossed with the signal field, a transducer for launching or receiving longitudinal acoustic wave results, with the same attributes as just mentioned, as is also considered within the scope of the generic invention. An alternative method of acoustic wave generation contemplated by the invention involves utilization of the torsional acoustic waves or torsional noise inherently produced in a rotating drill string. This alternative will be disclosed and claimed in a continuing application to be filed later.

The earlier discussed reduction in acoustic transmission losses resulting from utilization, in the present drill string communication system, of torsional acoustic waves, particularly zero order torsional waves within the base band frequency range of the drill string 12, together with the self-supporting construction of the present magnetostrictive transducers permits various types of acoustic wave communication through the drill string. When monitoring drilling parameters, such as those mentioned earlier, the preferred method of communication involves launching the waves downwardly through the drill string from the surface to the subsurface signal-transmitting station 14. The waves are modulated at this station with the telemetric signal representing the drilling parameters to be monitored and returned upwardly through the drill string to the surface signal receiving station 16. A primary advantage of this communication method resides in the fact that the torsional wave generating transducer may be located out of the well bore. The transducer is then isolated from the hostile environment in the well bore, is readily accessible for servicing and repair without removal of the drill string, and is free of the design constraints imposed by the drill string envelope.

The drill string communication system illustrated in FIGS. 1–14 employs this preferred method of acoustic communication. Referring now in greater detail to this communication system, the means 18 for inducing torsional acoustic waves in the drill string 12 comprises a torsional acoustic wave generator which is embodied in the drilling kelly 42. Broadly, these may be of any suitable form. The preferred generator, however, includes a lower crossed-field magnetostrictive transducer 66 according to the invention, and an upper torque reaction stub 70, as shown in FIG. 3. The transducer and torque reaction stub have tubular bodies 72, 76, respectively, rigidly joined end to end in any convenient way. These tubular bodies have a uniform, non-circular, usually square, cross section matching that of a conventional drilling kelly and together constitute the drilling kelly 42.

The lower end of the kelly 42, that is, the lower end of transducer body 72, is coupled to the upper end of the drill string 12 by a tool joint 78. Swivel 40 is rotatably coupled to an extension 79 at the upper end of the kelly, that is, to the upper end of the upper reaction stub body 76. As shown in FIGS. 1–14, this swivel has an inverted cup-like housing 80 receiving the upper end of the stub body extension 79. The housing is attached to the extension by a pair of combined radial and thrust bearings 82. A seal ring 84 provides a liquid tight seal between the housing and extension. The kelly 42 is thus restrained against longitudinal movement but is free to rotate to the swivel housing 80. At the upper end of the housing is a lifting bail 86 by which the housing and hence the kelly 42 and drill string 12, are suspended from the travelling block 36 of hoist 34.

The mud hose 56 connects to the swivel housing 60 and opens to the interior housing chamber 88 above the seal 84. Extending centrally through the kelly 42 is a mud passage 90 through which drilling mud entering the chamber 88 through the mud hose 56 flows to the central mud passage in the drill string 12.

As noted above, the torsional wave transducer 66 is a crossed-field magnetostrictive transducer. Transducers of this general class are know in the art. Such a transducer requires an elongated body of magnetostrictive material and means for establishing two magnetic fields within the body. One field is an axial field whose field lines extend longitudinally through the body. The other field is a transverse field whose field lines extend circumferentially through the body. One field is commonly referred to as a bias field and the other as a signal field. Either field may serve as the bias field and the other field as the signal field. The interaction of the bias and signal fields produces a torsional strain in the body which may be caused to fluctuate in such a way as to induce torsional oscillations in the body by varying, at the proper frequency, either or both the bias and signal fields. In this mode, the transducer is either a torsional wave generator or modulator, i.e., signal transmitter. The transducer is also capable of operating in an acoustic signal receiving mode. Thus a torsional strain within the transducer body with only one of the transducer fields present induces in the other field conductors a voltage, at the conductor terminals, proportional to the rate of strain. The communication system of FIGS. 1–14 employs the magnetostrictive transducer 66 as both a torsional wave generator and a signal receiver.

In such a crossed-field magnetostrictive transducer, the fields in the longitudinal and circumferential directional may be established in various ways. For example, the field in the circumferential direction may be established by passing a current longitudinally through the transducer body or through a conductor within the body. The field in the longitudinal direction may be established by passing a current through a coil surrounding the body. Alternatively, either field may be established by constructing the transducer body of a magnetically remanent magnetostrictive material which is permanently magnetized in the proper direction. The field in the longitudinal direction may also be established by permitting magnets along the transducer. Further details of the magnetostrictive transducer are given in our parent U.S. Pat. No. 3,790,930.

It is significant to note here that in the present drill string communication applications, the mechanical properties of the transducer body also enter into the selection of the magnetostrictive material for the body. Foremost among these mechanical properties are machinability, tensile strength, effect of tensile stress on the magnetostrictive characteristics, electrical conductivity, and others.

The crossed-field magnetostrictive transducer 66 embodied in the well drilling apparatus of FIGS. 1–14 is designed for remanent operation. To this end the transducer body 72 has a major central portion 72P constructed of a magnetically remanent magnetostrictive material In this instance the material is biased with a remanent field in the longitudinal direction.

Fixed to and extending the full length of the kelly mud passage 90 is a sleeve 94 of copper or the like which provides an inner signal-field conductor of the transducer. Fixed within channels 96 in the four sides of and extending the full length of the kelly 42 are strips 98 of copper or the like which provide outer signal-field conductors of the transducer. These outer conductors are electrically insulated from the transducer body 72 by electrical insulation 100. The lower ends of the inner and outer conductors 94, 98 are electrically connected at 102. The upper ends of the conductors are electrically connected to the leads of a cable 104 through collector rings 106 surrounding the upper end of the kelly 42 and collector brushes 108 carried by the swivel housing 80. The upper collector ring is assured good electrical contact to the inner conductor by means of copper rivets 107. The lower collector ring is in direct electrical contact with the outer conductors.

As will be explained in more detail presently, a driving signal is applied to the transducer signal-field conductors 94, 98, through the cable 104. This driving signal produces in the conductors a fluctuating current which induces in the transducer body 72P a circumferential magnetic signal field that interacts with the longitudinal remanent bias field of the body to produce an alternating torsional strain in the body. Such alternating torsional strain, in turn, propagates as a torsional wave downwardly through the drill string 12 to the subsurface signal transmitting station 14. The torsional waves are modulated at the signal transmitting station with a telemetric signal representing the drilling parameters to be monitored and returned upwardly through the drill string to the surface, in the manner to be explained presently. These modulated waves are received by the transducer 66 and then demodulated to recover the transmitted signal.

It will be recalled from the earlier description that the preferred embodiments of the invention, (FIGS. 1–14) contemplates any torsional acoustic waves capable of propagation through the drill string 12 and capable of modulation by the telemetric signal to be monitored to achieve effective signal transmission from the subsurface signal transmitting station 14 to the surface signal receiving station 16.

It will be further recalled, however, that the preferred waves are torsional acoustic waves of zero order and of the proper frequency to effect wave propagation through the drill string 12 in its base band. In this latter regard, attention is directed to FIG. 13. This figure depicts the relationship between a quantity T, representing the relative transmission of torsional acoustic wave propagation through a drill string, and the frequency $f$ of the torsional waves expressed in units of quantity $f_o$. This latter quantity is the torsional wave frequency at which the transmission quantity T first becomes zero. The frequency quantity $f_o$ is related to the velocity $c$ of torsional wave propagation through the drill string and a distance d, (the effective acoustic distance between the drill string couplings 62) by the following equation.

$$f_o = \frac{c}{4d}$$

As indicated in FIG. 13, the base band of torsional wave propation through the drill string 12 occurs in the region between $f=0$ and $f=f_o$. From this it will be understood that propagation of the torsional acoustic waves of the invention through the drill string 12 is accomplished by exciting the transducer 66 with a driving signal having frequency components such that if $f$ is the frequency of a component, then $$0 \leq \frac{f}{f_o} \leq 1$$

For a standard drill string composed of 30 foot pipe sections and conventional tool joint couplings 62, $f_o$ is on the order of 80 Hz.

Returning again to the torsional wave transducer 66, the transducer body 72 will be recalled to have a torque reaction stub 70 which provides an acoustic reaction termination at the upper end of the transducer. While this upper reaction stub or termination may conceivably be designed to serve as an absorbing termination, the particular termination shown is assumed to be a reflecting termination.

The theory of reflecting terminations is well understood and hence need not be explained in great detail. Suffice it to say that the correct length of a reflecting termination depends on the nature of the reflections occurring at the upper end of the termination. For example, if the upper end of the termination is open, with no acoustic connection to any structure, the end constitutes a node for torque and an antinode for torsional displacement. In this case, the optimum termination length is an odd number of quarter wave lengths of the acoustic waves to be reflected. On the other hand, if the end of the termination is acoustically rigid, that is, anchored to a very large mass with an acoustic impedance large relative to that of the transducer and termination, the end of the termination is an antinode for torque and a node for torsional displacement. In this case, the optimum termination length is an even number of quarter wave lengths of the acoustic waves to be reflected. For intermediate cases, the termination must have an intermediate length determined by the acoustic conditions at the end of the termination. Obviously the torque reaction stub or termination 70 represents such an intermediate case and must be dimensioned accordingly.

It will be understood from the description to this point that the transducer 66 is excited with a driving signal of the proper frequencies to launch torsional acoustic waves of zero order downwardly through the drill string 12 in the base band of the drill string. The manner in which this driving signal is generated will be explained presently. Suffice it to say here that the driving signal is applied to the transducer through the cable 104, collector brushes 108, collector rings 106 and the upper rivets 107. The waves are modulated at the subsurface signal transmitting station 14 by the modulating means 20 and return to the signal receiving station 14, to provide at the receiving station modulated waves containing information representing the drilling parameters to be monitored.

It will be immediately evident to those versed in the art that a variety of acoustic wave modulating means 20 may be employed in the present drill string communication system. FIGS. 7–9 illustrate an inertial modulator for the system, others being disclosed in our U.S. Pat. No. 3,790,930. This inertial modulator has a central tube or pipe 110. Surrounding the upper end of the modulator pipe 110 is a relatively massive inertial cylinder 118. Inertial cylinder 118 is rotatably supported on and restrained against movement along the pipe 110 by combined radial and thrust bearings 120. Seals 122 seal the ends of cylinder to the pipe. Between its ends, the inertial cylinder 118 is internally enlarged to define an annular chamber 124 between the cylinder and the pipe 110. This chamber is filled with a magnetic fluid 126, such as a mixture of oil and powered iron. Contained in four uniformly spaced longitudinal slots 128 in the portion of the modulator pipe 110 within the chamber 124 is a drive coil 130. As shown best in FIG. 8, the conductors of the drive coil extend lengthwise of the slots 128. Moreover, as indicated by the + and − signs in the figure, the drive coil is wound in such a way that when a voltage is impressed across the coil, current flows in one direction through the conductors in two diametrically opposed slots and in the opposite direction through the conductors in the remaining two diametrically opposed slots.

It will now be understood that the modulator structure described thus far constitutes, in effect, an electromagnetic clutch. Thus, when the drive coil 130 is deenergized, the pipe 110 and inertial cylinder 118 are capable of relatively free relative rotation. Energizing of the drive coil produces a magnetic coupling between the pipe and cylinder which resists relative rotation of the pipe and cylinder with a torque proportional to the current flow through the drive coil.

Surrounding and fixed to the modulator pipe 110 below the inertial cylinder 118 is an annular circuit housing 132 containing the driving circuit 134 for the modulator drive coil 130. The drive coil is connected to the output of the circuit through leads 135. Modulator driving circuit 134 will be described shortly.

Between the modulator 20 and the drill collar 63 is a lower reactance termination 136. This reactance termination comprises a section of drill pipe or a pipe collar of the proper mass and length to constitute a reflecting termination for the torsional acoustic waves launched downwardly through the drill string 12 by the topside transducer 66. The earlier discussion relative to the topside reflecting termination 70 applies with equal force to the termination 136. The modulator pipe 110 and lower termination are connected end to end in the drill string 12 by conventional tool joints. In this regard, it will be observed that the pipe and termination transmit drilling torque to the drilling cutter 64 and support the weight of the drill string below and thus must be designed to have sufficient torsional and tensile strength to withstand these loads. Extending through these components are mud passages which form a continuation of the drill string mud passage.

As noted earlier, it is desirable or necessary during a drilling operation to monitor several different drilling parameters in the vicinity of the drilling cutter 64. Some of these parameters were listed in the earlier description and thus need not be repeated here. Suffice it to say that the sensors 65 are selected and arranged within the drill collar 63 to be responsive to the particular drilling parameters to be monitored. In this regard, it is significant to note that sensors for this purpose are wellknown and available on the commercial market. Accordingly, it is unnecessary to describe the sensors except to say that each sensor produces an electrical output representing its respective drilling parameter. The several sensors 65 are electrically connected through leads 146 to the input of the modulator driving circuit 134.

The modulator driving circuit 134 will be explained presently. Suffice it to say here that the circuit effectively combines the several outputs from the drilling parameter sensor 65 and produces a telemetric signal containing information representing all the drilling parameters. This telemetric signal is processed to produce a corresponding modulator driving signal which is applied to the modulator drive coil 130 and produces a corresponding fluctuating magnetic coupling between the inner pipe 110 and outer inertial cylinder 118 of the modulator 20. As a consequence the torsional acoustic waves propagating downwardly through the drill string 12 and the modulator pipe 110 to the lower reaction termination 136 and then reflected from the termination upwardly through the pipe and drill string are modulated to contain information representing the drilling parameters being monitored. Thus, an increase in the magnitude of the modulator driving signal produces a corresponding increase in the magnetic coupling between the modulator pipe and inertial cylinder, thereby increasing the effective torsional mass of the pipe and retarding the phase as well as altering the amplitude of the waves when traveling through the modulator. Similarly, a decrease in the magnitude of the driving signal produces a corresponding reduction in the magnetic coupling between the modulator pipe and inertial cylinder, thereby reducing the effective torsional mass or movement of the pipe and advancing the phase as well as altering the amplitude of the waves then traveling through the modulator.

The modulated waves travel upwardly through the drill string 12 to the surface signal receiving station 16. These modulated waves produce a corresponding fluctuating torsional strain in the magnetostrictive body 72 of the transducer 66, thereby including in the transducer field conductors 94, 98 a fluctuating voltage containing information representing the transmitted telemetric signal. As explained below, the voltage signal from the transducer is processed by a combined transducer driving-receiving circuit at the surface to recover the transmitted information representing the drilling parameters being monitored.

Turning now to FIG. 11 there is illustrated the general arrangement of one illustrative modulator driving circuit 134 which is contained in the modulator circuit housing 132. As noted, this circuit converts the outputs from the drilling parameter sensors 65 to a coded driving signal for the modulator 20. This driving circuit includes a power source (not shown), such as a battery, an encoder 148 and modulator driving circuitry 150. The encoder is connected to the drilling parameter sensors 65 to receive the several sensor outputs and processes these outputs to produce a telemetric signal containing information representing all of the sensor outputs. This telemetric signal is applied to the driving circuit 150 which processes the signal in such a way as to produce a modulated driving signal for the modulator drive coil 130.

The driving circuit 134 may utilize various signal processing techniques for converting the outputs from the drilling parameter sensors 65 to a suitable driving signal for the inertial modualtor 20 or for a crossed-field magnetostrictive transducer when employed as a modulator.

Suffice it to say that FIG. 12 shows a binary phase coded system wherein the encoder 148 is a binary digital encoder for converting the analog outputs from the sensors 65 to a binary digital signal containing information representing the outputs of all the sensors. The modulator driving circuit 150 is a power amplifier which amplifies this binary digital signal to the proper strength for driving the modulator 20.

Considering now the system of FIG. 10, there is connected to the topside transducer 66 a driving and receiving electronic system, comprising means 154 (FIG. 14) for separating the driving signal to and the information signal from the transducer. The means 154 shown in FIG. 14 is a hybrid juction having one branch connected to the transducer field conductors 94, 98. A second branch of the hybrid is connected to a transducer driving circuit 156 including a high power drive source 158. Connected to the third branch of the hybrid is a transducer receiving circuit 160 including an amplifier 162, phase detector 164, digital decoder 166, and an output display or recorder 168. The reference input of the phase detector 164 is connected to the source 158 through an attenuator 170.

The operation of transducer 66 and driving and receiving circuit 152 will be immediately evident to those versed in the art. Thus, the hybrid junction 154 feeds the high power driving signal from the source 158 to the transducer field conductors 94, 98 to drive the transducer to launch the earlier described torsional acoustic waves downwardly through the drill string 12. At the subsurface signal transmitting means station 14, these waves are modulated to contain the information representing the telemetric signal to be transmitted and are returned upwardly through drill string 12. These modulated waves produce a fluctuating torsional strain in the transducer body 72 and thereby a corresponding fluctuating voltage signal in the transducer field conductors 94, 98. The hybrid junction 154 feeds this voltage signal to the receiving circuit 160. This signal is amplified by amplifier 162 and its phase is compared to the phase of the transducer driving signal in the phase detector 164 to provide an output representing the telemetric signal. The digitial decoder 166 reduces the output of the phase detector to discrete output signal representing the various monitored drilling parameters. These output signals are then displayed or recorded as drilling parameter information by the display or recorder 168.

Figure 15:
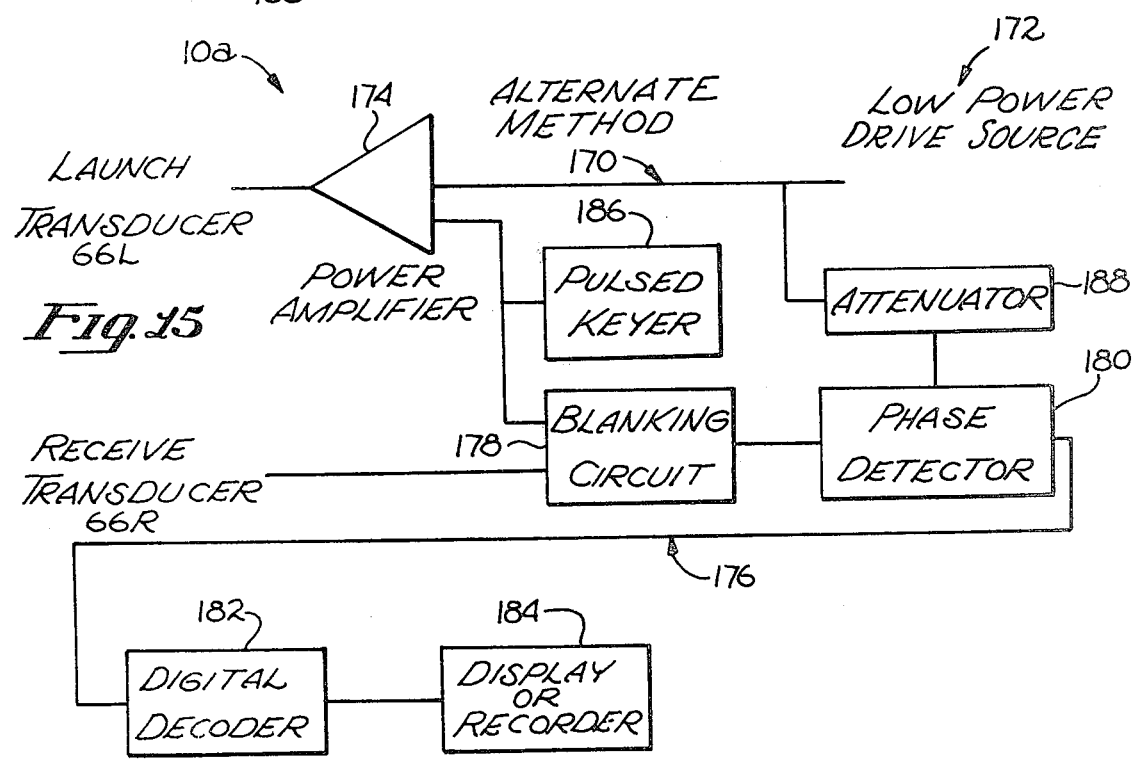
FIG. 15 is a diagram of the top side transducer electronics of a modified drill string communication system having separate acoustic wave launching and receiving transducers.

In some applications it may be desirable or essential to employ separate transducers at the surface for launching the torsional acoustic waves downwardly through the drill string 12 to the subsurface signal transmitting station 14 and receiving the modulated waves returning to the surface. FIG. 15 illustrates such a dual transducer communication system 10a. In this system, the signal transducer 66 in FIGS. 1–14 is replaced by launch and receive transducers 66L, 66R coupled end to end at the upper end of the drill string. The launch transducer has a driving circuit 170 comprising a low power source 172 connected through a power amplifier 174 to the field conductors 94, 98 of the transducer. The receiving transducer has a receiving circuit 176 connected to the field conductors 94, 98 of the transducer. This circuit includes a blanking circuit 178, phase detector 180, digital decoder 182, and output display or recorder 184. A pluse keyer 186 is connected to the amplifier 174 and blanking circuit 178, phase detector 180 is connected through an attenuator 188 to the source 172.

The operation of communication system 10a (FIG. 15) is similar to that of communication system 10, except that the driving and receiving circuits 170, 176 are activated alternatively by the pulse keyer 186. During the intermittent transducer driving modes of the system 10a, the pulse keyer conditions the launch amplifier 174 to feed an amplified signal to the launch transducer 66L and conditions the blanking circuit 178 to block the output of the receiver transducer 66R. Under these conditions the launch transducer 66L is driven by the amplified driving signal from the source 172 to launch torsional acoustic waves downwardly through the drill string 12. During the intervening transducer receiving modes of the system, the pulse keyer 186 conditions the launch amplifier 174 to block signal transmission to the launch transducer 66L and conditions the blanking circuit 178 to pass the output of the receiver transducer 66R. Under these conditions, the fluctuation voltage signal induced in the receiving transducer 66R by the returning modulated waves is fed to the receiving circuit 176 to produce a display or recording of the drilling parameter information being monitored.

Those versed in the art will understand at this point that the drilling string in the various disclosed inventive embodiments constitutes an acoustic transmission line and that the various elements in the drill string, such as tool joints, acoustic wave generator and modulator, and the like, constitute perturbations in the string at which occur a complex action of partial reflection and partial transmission of the acoustic wave traveling through the drill string. However, it can be demonstrated by well-known mathematical transmission line analysis techniques that during operation of the present well bore communication system, the several acoustic wave reflections and transmission result in transmission from the signal transmitting station to the signal receiving station of net or resultant modulated acoustic waves containing information representing the signal impressed on the modulator or transducer at the transmitting station and hence also representing the drilling parameter or other information to be transmitted. These net or resultant modulated acoustic waves are demodulated at the signal receiving station in the manner heretofore explained to recover the transmitted information.

From the foregoing description, it will be understood that various changes in the detailed construction and arrangement of the parts constituting the telemetering system for oil wells of the present invention may occur to those skilled in the art without departing from the spirit and scope of the present invention. Accordingly, it is to be understood that the foregoing description is considered to be illustrative of, rather than limitative upon, the invention as defined by the appended claims.

What is claimed is:

1. A method of communicating information between signal-transmitting and signal-receiving stations spaced along a pipe having an intervening length between said stations capable of sustaining acoustic waves within the substance of the pipe, said method comprising the steps of:

generating a modulating signal containing the information to be transmitted;

at a location separate from said transmitting station, generating acoustic waves subsequently to be modulated with the information to be transmitted, and causing said waves to travel along said pipe within the substance thereof to said transmitting station;

modulating said acoustic waves in said pipe at said transmitting station by said modulating signal according to a predetermined modulating mode to contain the information to be transmitted, all in such manner that resulting modulated acoustic waves then travel from said transmitting station to said receiving station through the substance of the pipe; and receiving said modulated waves at said receiving station to recover said signal and its contained information.

2. The acoustic communication method according to claim 1 wherein:

said pipe is a drill string suspended from a drilling platform.

3. The communication method according to claim 2 wherein:

said pipe is a drill string suspended within a well bore from a drilling platform;

at least one of said stations is located within said well bore; and said acoustic waves are generated in said drill string by driving said drill string in acoustic oscillation at frequencies within a selected range of frequencies.

4. A communication method according to claim 1 wherein:

said pipe is a drill string suspended within a well bore from a drilling platform;

said transmitting station is located in said well bore; and said step of generating said modulated acoustic waves in said drill string comprises driving it in acoustic oscillation from a top-side location above said transmitting station to launch acoustic waves downwardly through said drill string to said transmitting station, modulating with said information containing signal the acoustic waves arriving at the transmitting station; and returning the modulated waves back through said drill string to said receiving station.

5. A communication system for communicating information between signal-transmitting and signal-receiving stations spaced along a pipe having a intervening length between said stations capable of sustaining acoustic waves within the substance of the pipe, said system comprising:

means for generating a modulating signal containing the information to be transmitted;

means at a location separated from said transmitting station for generating acoustic waves subsequently to be modulated with the information to be transmitted, in a manner to cause said waves to travel along said pipe within the substance thereof to said transmitting station;

means for modulating said acoustic waves at said transmitting station by said modulating signal according to a predetermined modulating mode to contain the information to be transmitted, the resulting modulated acoustic waves then traveling from said transmitting station to said receiving station through the substance of the intervening length of the pipe; and means for receiving said modulated waves at said receiving station to recover said signal and its contained information.

6. An acoustic communication system according to claim 5 wherein:

said pipe is a drill string suspended within a well bore from a drilling platform; and one of said stations is located within said well bore.

7. An acoustic communication system according to claim 6 wherein:

said means for generating said acoustic waves comprises an acoustic wave transducer coupled to said drill string.

8. An acoustic communication system according to claim 6 wherein:

said means for receiving said acoustic waves comprises an acoustic wave transducer coupled to said drill string for receiving from said drill string acoustic waves.

9. An acoustic communication system according to claim 6 wherein:

said means for generating and receiving said acoustic waves comprises an acoustic wave transducer coupled to said drill string that both generates and receiver acoustic waves in said drill string.

10. An acoustic communication system according to claim 5 wherein:

said pipe is a drill string suspended within a well bore from a drilling platform;

said transmitting station is located within said well bore and said receiving station is located above said transmitting station; and said means for generating said acoustic waves comprises an eletroacoustic transducer means coupled to said drill string above said transmitting station and adapted to be energized by an electrical driving signal of selected frequencies for driving said drill string in acoustic oscillation to launch acoustic waves downwardly through said drill string to said transmitting station, and means including a modulator coupled to said drill string at said transmitting station for modulating with said information containing signal the acoustic waves arriving at the transmitting station and returning the modulated acoustic waves back through said drill string to said receiving station.

11. An acoustic communication system according to claim 5 wherein:
   said pipe comprises a drill string suspended within a well bore from a drilling platform and one of said stations is located within said well bore;
   said drill string includes a drilling kelly at the upper end of said string; and
   said means for generating said acoustic waves comprises an electroacoustic transducer embodied in said kelly.

12. An acoustic communication system according to claim 5 wherein:
   said pipe is a drill string suspended within a well bore from a drilling platform; and
   said transmitting station is located within said well bore and said receiving station is located above said transmitting station; and
   said means for generating said acoustic waves comprises an electroacoustic transducer in and forming a section of said drill string.

13. An acoustic communication system according to claim 11 wherein:
   said pipe comprises a drill string suspended within a well bore from a drilling platform;
   said transmitting station is located within said well bore and said receiving station is located above said transmitting station;
   said means for generating said acoustic waves comprising electroacoustic transducer means coupled to said drill string at said receiving station,
   electric circuit means for energizing said transducer means with a driving signal to launch acoustic waves downwardly through said drill string to said transmitting station;
   said receiving means comprising electroacoustic transducer means at said receiving station for receiving the returning modulated acoustic waves and an electric demodulator circuit means coupled thereto.

14. An acoustic communication system according to claim 13 wherein:
   said electroacoustic transducer means comprises a single common acoustic wave generating and receiving means.

15. An acoustic communication system according to claim 13 wherein:
   said elecacoustic transducer means comprises separate acoustic wave generating and receiving means.

16. A communication method according to claim 1, wherein:
   said pipe is a drill string suspended within a well bore from a drilling platform;
   said transmitting station is located in said well bore; and
   said step of generating said modulated acoustic waves in said drill string comprises driving said string in zero order torsional oscillation from a location above said transmitting station to launch torsional waves of zero order downwardly through said drill string to said transmitting station, and modulating with said information containing signal the zero order torsional waves arriving at the transmitting station and returning the modulated waves back through said drill string to said receiving station.

17. An acoustic communication system according to claim 5 wherein:
   said pipe is a drill string suspended within a well bore from a drilling platform;
   said transmitting station is located within said well bore and said receiving station is located above said transmitting station; and
   said means for generating said acoustic waves comprises an electroacoustic transducer coupled to said drill string above said transmitting station and adapted to be energized by an electrical driving signal for driving said drill string in zero order torsional oscillation to launch zero order torsional acoustic waves downwardly through said drill string to said transmitting station, and means including a modulator coupled to said drill string at said transmitting station for modulating with said information containing signal the zero order torsional acoustic waves arriving at the transmitting station and returning the modulated zero order torsional acoustic waves back through said drill string to said receiving station.

18. An acoustic communication system according to claim 10, wherein:
   said acoustic waves are torsional waves of zero order;
   a kelly included in the drill string at the upper end thereof; and
   said transducer means comprising an electroacoustic torsional transducer embodied in said kelley.

19. An acoustic communication system according to claim 5, wherein:
   said pipe is a drill string suspended within a well bore from a drilling platform.

20. The subject matter of claim 10, wherein:
   said electroacoustic transducer means is located in the vicinity of the platform.

* * * * *